(12) United States Patent
Siev et al.

(10) Patent No.: US 11,128,644 B2
(45) Date of Patent: *Sep. 21, 2021

(54) AUTOMATIC SECURITY SCANNING OF ADVERTISEMENTS DURING RUNTIME OF SOFTWARE APPLICATIONS

(71) Applicant: FIVE MEDIA MARKETING LIMITED, Nicosia (CY)

(72) Inventors: Amnon Sem Siev, Hod Hasharon (IL); Yehuda Sapir, Eli (IL); Ido Peled, Tel Mond (IL); Itamar Mula, Tel Aviv (IL); Eliyahu Babila, Ramat Gan (IL)

(73) Assignee: FIVE MEDIA MARKETING LIMITED, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,479

(22) Filed: Nov. 3, 2019

(65) Prior Publication Data

US 2020/0304525 A1 Sep. 24, 2020

Related U.S. Application Data

(63) Continuation-in-part of application No. 16/357,644, filed on Mar. 19, 2019, now Pat. No. 10,467,408.

(51) Int. Cl.
*G06F 21/55* (2013.01)
*G06F 21/71* (2013.01)
(Continued)

(52) U.S. Cl.
CPC .......... *H04L 63/1416* (2013.01); *G06F 8/20* (2013.01); *G06Q 30/0276* (2013.01); *H04L 63/101* (2013.01)

(58) Field of Classification Search
None
See application file for complete search history.

(56) References Cited

U.S. PATENT DOCUMENTS

| 7,000,183 B1 | 2/2006 | Crawford, Jr. |
| 7,287,089 B1 | 10/2007 | Lamoureux et al. |
| (Continued) | | |

FOREIGN PATENT DOCUMENTS

| CN | 104346569 A | 7/2013 |
| CN | 103559446 B | 2/2014 |
| (Continued) | | |

OTHER PUBLICATIONS

CN 104751051. English Translation. Beike. (Year: 2015).*

(Continued)

*Primary Examiner* — Venkat Perungavoor
(74) *Attorney, Agent, or Firm* — The Roy Gross Law Firm, LLC; Roy Gross

(57) ABSTRACT

Automatically detecting that a software application has received, over a network, advertising code that is configured to display an advertisement within the software application; intercepting the received advertising code; wrapping the intercepted advertising code with program code that is configured to: scan the advertising code for malicious content, and allow or prevent the display of the advertisement within the software application based on the scanning; delivering the wrapped advertising code to the software application as if the wrapped advertising code was received directly from the server, such that, when the wrapped advertising code is executed in the software application: the advertising code is scanned, and the display of the advertisement is allowed or prevented based on the scanning.

29 Claims, 2 Drawing Sheets

(51) Int. Cl.
  *H04L 29/06* (2006.01)
  *G06Q 30/02* (2012.01)
  *G06F 8/20* (2018.01)
  *G06F 21/51* (2013.01)

(56) References Cited

U.S. PATENT DOCUMENTS

| | | | |
|---|---|---|---|
| 7,451,321 | B2 | 11/2008 | Dryer |
| 7,917,755 | B1 | 3/2011 | Giliyaru et al. |
| 8,516,590 | B1 | 8/2013 | Ranadive et al. |
| 8,555,391 | B1 | 10/2013 | Demir et al. |
| 9,027,140 | B1 | 5/2015 | Watkins et al. |
| 9,509,714 | B2 | 11/2016 | Sivan et al. |
| 10,205,749 | B1 | 2/2019 | Sem Siev et al. |
| 10,320,816 | B1 | 6/2019 | Smith |
| 2003/0092425 | A1* | 5/2003 | Okazaki .......... H04L 63/12 455/411 |
| 2005/0076215 | A1 | 4/2005 | Dryer |
| 2010/0306344 | A1 | 12/2010 | Athas et al. |
| 2011/0019853 | A1 | 1/2011 | Chang |
| 2011/0219448 | A1 | 9/2011 | Sreedharan et al. |
| 2012/0296713 | A1 | 11/2012 | Abdulhayoglu |
| 2013/0080867 | A1 | 3/2013 | Vandervort et al. |
| 2013/0086255 | A1 | 4/2013 | Burckart et al. |
| 2013/0160120 | A1 | 6/2013 | Malaviya et al. |
| 2014/0040394 | A1 | 2/2014 | Wenliang et al. |
| 2014/0067538 | A1 | 3/2014 | Hook et al. |
| 2015/0371040 | A1 | 12/2015 | Ding et al. |
| 2016/0063572 | A1 | 3/2016 | Brown et al. |
| 2016/0088015 | A1 | 3/2016 | Sivan et al. |
| 2016/0261623 | A1 | 9/2016 | McClintock et al. |
| 2017/0243238 | A1 | 8/2017 | Kosai et al. |
| 2017/0243243 | A1 | 8/2017 | Kosai et al. |
| 2018/0027291 | A1* | 1/2018 | Chen ............... H04L 29/08747 709/224 |
| 2018/0332076 | A1 | 11/2018 | Callahan et al. |
| 2019/0394221 | A1* | 12/2019 | Xiao ............... H04L 63/145 |

FOREIGN PATENT DOCUMENTS

| | | | |
|---|---|---|---|
| CN | 104199934 B | 12/2014 | |
| WO | WO-2015014299 A1 * | 2/2015 | ............ G06F 21/56 |

OTHER PUBLICATIONS

CN 104199934. English Translation. Qihoo. (Year: 2014).*
CN 103093148. English Translation. Oppo. (Year: 2013).*
CN 103559446. English Translation. (Year: 2014).*
Blocking Advertisements on Android Devices using Monitoring Techniques. El-Harake et al. (Year: 2014).*
A First Look at Mobile Ad-Blocking Apps. Ikram. (Year: 2017).*
AppShield: Enabling Multi-entity Access Control Cross Platforms for Mobile App Management. Qu. (Year: 2016).*
CN 103065090A. English Translation. (Year: 2012).*
FIViz: Forensics Investigation through Visualization for Malware in Internet of Things. Ahmad. Sustainability. (Year: 2020).*
Secure development model for mobile applications. A. Majchrzycka. DeGruyter Online. (Year: 2016).*
A Bayesian Game Theoretic Approach for Inspecting Web-Based Malvertising. Huang. IEEE. (Year: 2020).*
Marco Balduzzi et al., "A Solution for the Automated Detection of Clickjacking Attacks", ASIACCS'10 Apr. 13-16, 2010.
Gustav Rydstedt et al., "Busting Frame Busting: a Study of Clickjacking Vulnerabilities on Popular Sites", In in IEEE Oakland Web 2.0 Security and Privacy (W2SP), 9 pages, 2010.
Jawwad A. Shamsi et al., "Clicksafe: Providing Security Against Clickjacking Attacks", 2014 IEEE 15th International Symposium on High-Assurance Systems Engineering, p. 206-210, 2014.
How to protect yourself from rogue redirect ads right now in Chrome, https://www.androidpolice.com/2017/11/08/heres-protect-rogue-redirect-ads-right-now-chrome/, retrieved May 22, 2018.
Iframe-buster-killer, https://github.com/quafzi/iframe-buster-killer/blob/master/iframe-buster-killer.js, retrieved May 22, 2018.
Frame Buster Buster . . . buster code needed, https://stackoverflow.com/questions/958997/frame-buster-buster-buster-code-needed, retrieved May 22, 2018.
Stop redirect from iframe | Warrior Forum—The #1 Digital Marketing Forum & Marketplace, https://www.warriorforum.com/website-design/429413-stop-redirect-iframe.html, retrieved May 22, 2018.
What is safe Frame or Safe Frame Container ?, http://adtagmacros.com/what-is-safe-frame-safe-frame-container/, retrieved May 22, 2018.
How to prevent IFRAME from redirecting top-level window, https://stackoverflow.com/questions/369498/how-to-prevent-iframe-from-redirecting-top-level-window, retrieved Oct. 2, 2018.
Is there a way to prevent an iframe from redirecting parent window, but in such a way that "top level" redirects still work inside the iframe itself?, https://stackoverflow.com/questions/25958241/is-there-a-way-to-prevent-an-iframe-from-redirecting-parent-window-but-in-such, retrieved Oct. 2, 2018.
IAB Technology Lab, "OpenRTB Specification v3.0," (Nov. 2018), available online at https://github.com/InteractiveAdvertisingBureau/openrtb/blob/master/OpenRTB%20v3.0%20FINAL.md.
XIOS: Extended Application Sand-boxing on IOS. Bucicoiu et al ACM (Year: 2015).
Reliable Third-Party Library Detection in Android and its Security applications. Backes et al ACM (Year 2016).
Geoedge blocking malware offensive ads webpage (Year: 2018).
Geoedge Operation Fingerprint (Year: 2018).
U.S. Appl. No. 16/357,644 Security Management of Advertisements at Online Advertising Networks and Online Advertising Exchanges, filed Mar. 2019.
U.S. Appl. No. 16/263,425 Detection and Prevention of Automatic Redirects of Main HTML Document From Within Nested Sub-Document, Siev Amnon Sem et al, filed Jan. 2019.
U.S. Appl. No. 16/507,925 Security Management of Advertisements at Online Advertising Networks and Online Advertising Exchanges, filed Jul. 2019, Siev Amnon Sem et al.
Y. Yuan et al, "A survey on real time bidding advertising", IEEE 2014.
C. Dwyer et al, "A Rising Threat to the Online Ecosystem", Journal of Information Systems Applied Research, Dec. 2017, vol. 10 Issue 3.
Li, et al., "Knowing your Enemy: Understanding and Detecting Malicious Web Advertising", Proceedings of the 2012 ACM conference on Computer and communications security, (pp. 674-686) (2012).
Dwyer, et al., "Gone in 200 Milliseconds: The Challenge of Blocking Malvertising",Student and Faculty Research Days, (2016).
Unknown author; "HTML standard of the WC3.pdf"; Retrived from the Internet on Jul. 20, 2018 (Year: 2018).
Unknown author; Hypertext Transfer Protocol—HTTP1_1.pdf; Retrived from the Internet on Jul. 20, 2018 (Year 2018).
Unknown author; "ECMAScript 2018 Language Specification.pdf"; Retrived from the Internet on Jul. 20, 2018 (Year: 2018).
Wang et al.; Discovering typical structures of documents: a road map approach; Published in: Proceeding SIGIR '98 Proceedings of the 21st annual international ACM SIGIR conference on Research and development in information retrieval; Melbourne, Australia—Aug. 24-28, 1998; ACM Digital Library (Year: 1998).
Saadi et al.; Morph Digital Signature a New Signature Framework fore-Documents in Pervasive Environments; Published in: IEEE International Conference on Pervasive Services; Date of Conference: Jul. 15-20, 2007; IEEE Xplore (Year: 2007).

* cited by examiner

AUTOMATIC SECURITY SCANNING OF ADVERTISEMENTS DURING RUNTIME OF SOFTWARE APPLICATIONS

CROSS-REFERENCE TO RELATED APPLICATIONS

This application is a continuation-in-part of U.S. patent application Ser. No. 16/357,644, filed Mar. 19, 2019, entitled "AUTOMATIC SECURITY SCANNING OF ADVERTISEMENTS DURING RUNTIME OF SOFTWARE APPLICATIONS," which is incorporated herein by reference in its entirety.

BACKGROUND OF THE INVENTION

The invention relates to the field of Internet security.

Advertisements that are displayed inside software applications on portable computing device often rely on HTML (HyperText Markup Language) and/or Javascript code for their generation and rendering. This code may be used by malicious parties to execute security attacks on portable computing devices, in the disguise of an innocent advertisement. The code may involve sophisticated HTML and/or Javascript programming that, when executed by the portable computing device, causes it to install unwanted software, install computer viruses, display unwanted content, or to extract personal information from the portable computing device, to name a few examples.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

One embodiment relates to a method comprising: implanting or having implanted, in a software project that is being developed in an Integrated Development Environment (IDE), program code that is configured to execute the following actions on a computing device when the computing device runs a software application compiled from the software project: (a) automatically detect that the software application has received, over a network, an advertising code that is configured to display an advertisement within the software application; (b) automatically intercept the received advertising code; (c) automatically wrap the intercepted advertising code with program code that is configured to: scan the advertising code for malicious content, allow or prevent the display of the advertisement within the software application based on the scanning; and (d) automatically deliver the wrapped advertising code to the software application as if the wrapped advertising code was received directly from the server, such that, when the wrapped advertising code is executed in the software application: the advertising code is scanned for malicious content, the display of the advertisement is allowed or prevented based on the scanning.

In some embodiments, the actions further comprise, prior to execution of action (a): automatically detect that memory being used by the software application on the computing device includes instructions that are based on an advertising Software Development Kit (SDK) that was included in the software project; and wherein actions (a)-(d) interoperate with the instructions that are based on the advertising SDK.

In some embodiments, the program code that wraps the intercepted advertising code comprises JavaScript program code.

In some embodiments, the software application is an Android™ application, and wherein the actions further comprise: determine whether the advertising SDK: (i) uses an interface between objects to enable communication between an AdController-type class and an AdView-type class, or (ii) uses a class to enable communication between an AdController-type class and an AdView-type class.

In some embodiments, when condition (i) holds true: actions (a) through (d) are performed using a dynamic proxy.

In some embodiments, when condition (ii) holds true: actions (a) through (d) are performed using real-time generation of a class proxy.

In some embodiments, when neither one of conditions (i) and (ii) hold true: actions (a) through (d) are performed through a WebView-type object used by the software application.

In some embodiments, the software application is an iOS (ID application, and wherein actions (a) through (d) are performed by method swizzling.

In some embodiments, the method swizzling comprises overriding an implementation of an existing selector of the software application, wherein the existing selector is used by the software application to handle the receipt and the display of the advertisement.

In some embodiments, the scanning of the advertising code comprises: listening to software methods that attempt to invoke a user event without an action by a user of the computing device; and analyzing the user event to determine if the user event is configured to cause the computing device to perform an action outside a dedicated advertising space of the software application.

In some embodiments, the user event is determined to be configured to cause the computing device to perform the action outside the dedicated advertising space of the software application, if the user event is of the group consisting of: "document.createEvent"; "Event.initEvent"; and use of an "Event( )" constructor to create a new event.

In some embodiments, the user event is determined to be configured to cause the computing device to perform the action outside the dedicated advertising space of the software application, if: the user event comprises a registration of a new event listener.

In some embodiments, said new event listener is selected from the group consisting of: "EventTarget.addEventListener"; "attachEvent( )"; and "captureEvents( )".

In some embodiments, the preventing of the advertisement from being displayed comprises: preventing the user event from causing the computing device to perform the action outside the dedicated advertising space of the software application.

A further embodiment relates to a system comprising: (i) at least one hardware processor; and (ii) a non-transitory computer-readable storage medium having program code embodied therewith, the program code executable by said at least one hardware processor to perform the actions of any one of the above embodiments.

Another embodiment is directed to a computer program product comprising a non-transitory computer-readable storage medium having program code embodied therewith, the program code executable by at least one hardware processor to perform the actions of any one of the above embodiments.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
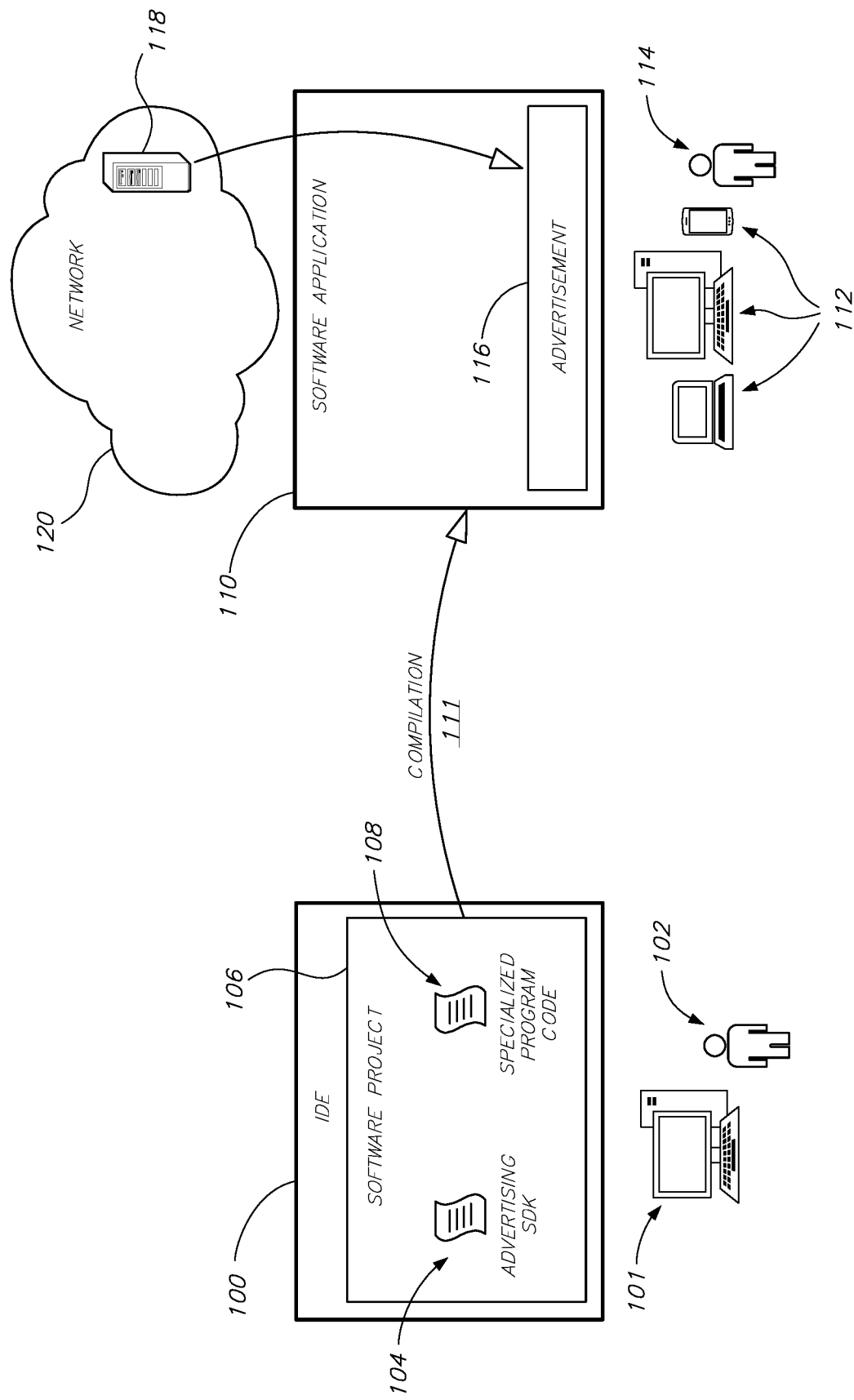
FIG. 1 is block diagram illustrating an embodiment of the present invention.

Disclosed herein are a method, a system, and a computer program product for implanting security software in software applications, during the development stage of the software applications. Specifically, the implanted security software, once the software application is run on a computing device, scans of source code of advertisements delivered to the computing device, and optionally blocks advertisements that include malicious content.

Advantageously, the implanted security software may be interoperable with various different advertising SDKs (Software Development Kits), such that, if any of these advertising SDKs have been used in the creation of the software application, the implanted security software can automatically perform said scanning and blocking.

Glossary

Integrated Development Environment (IDE): A software application that provides comprehensive facilities for developing software. An IDE commonly includes a source code editor, build automation tools, and a debugger. Many modern IDEs employ intelligent code completion to ease the work of software developers. Some IDEs contain a compiler, an interpreter, or both; others do not. Many modern IDEs also have a class browser, an object browser, and a class hierarchy diagram, for use in object-oriented software development. For developing software applications for portable computing devices (such as smartphones, tablets, and smart watches), the Xcode IDE (by Apple, Inc.) and the Android Studio IDE (by Google, Inc. and JetBrains s.r.o.) are commonly used.

Software project: An aggregate of computer files, including program code and optionally media (e.g., images, videos, sounds), that are composed together in an IDE and are edited therein. When development of the software project ends, the IDE (or an external compiler) compiles it into an executable (sometimes called "binary") software application that can run on a target computing platform, such as a portable computing device, a desktop computing device, or the like.

Software Development Kit (SDK): An SDK is a software development tool that allows the creation of software applications for a certain software framework, hardware platform, computer system, video game console, operating system, or the like. For example, the development of an Android® software application (also "app") on a Java® platform requires the Java Development Kit, for an iOS® application the iOS SDK, and for the Universal Windows Platform the .NET Framework SDK. Such SDKs may be obtained by a software developer and imported into or associated with an IDE with which the developer works.

Advertising SDK: An SDK of the type that enriches software applications with advertisements. Such advertising SDK may include one or more files containing program code, that can be imported into a software projected being developed in an IDE. Once imported, the advertising SDK allows the software developer to allocate advertising space within the software application, and define parameters for the display of advertisements (such as their location, size, timing of display, type (textual, graphic, video, etc.) and the like). The advertising SDK is designed to be compatible with the software project; for example, if the software project is of an iOS® application, then the advertising SDK would be designed, once compiled together with a suitable iOS® software project, to obtain advertisements over the Internet and display them on portable computing devices running the iOS® operating system. Examples of advertising SDKs include the Microsoft Advertising SDK, the Google Mobile Ads SDK, the Facebook Business SDK, and the AdMob SDK, each having different versions for different operating systems on which the software application is intended to run.

The various other technical terms used herein are intended to have the meaning prescribed in RFC 2616, "Hypertext Transfer Protocol—HTTP/1.1", available at https://tools.ietforg/html/rfc2616; in the Hypertext Markup Language (HTML) standard of The World Wide Web Consortium (W3C), available at https://www.w3.org/standards/techs/html; and in the Standard ECMA-262, "ECMAScript® 2018 Language Specification", available at https://www.ecma-international.org/publications/standards/Ecma-262.htm, (also known as the 'Javascript standard').

Reference is now made to FIG. 1, which shows a block diagram illustrating an embodiment of the present invention. On the left are shown an IDE 100 which runs on or is accessed by a computer 101 of a human software developer (hereinafter "developer") 102. The software developer adds an advertising SDK (hereinafter, for convenience, "aSDK") 104 to a software project 106 being edited in the IDE. Specialized program code 108 is also implanted in software project 106, either automatically or manually by the developer; this program code, once software project 106 is compiled into a software application, is configured to execute certain actions in order to scan advertising code in a computing device running the software application, and optionally prevent the display of advertisements which include malicious content.

Once developer 102 finishes programming software project 106, the software project is compiled 111 into a software application 110 that is configured to run on a computing device 112, which may be a portable computing device (running an operating system such as Android™, iOS®, BlackBerry® OS, Windows® Mobile, or Tizen™) or a desktop/laptop computing device (running an operating system such as Windows®, macOS®, or Linux).

As software application 110 is used by a user 114 of computing device 112, an advertisement 116 may be received by the software application, from a server 118, over a network (such as the Internet) 120. The location (in the software application) of the advertisement, its size, type, and similar parameters, are those that were defined by developer 102 when he or she edited aSDK 104 in software project 106.

However, before advertisement 116 is displayed within software application 110, the software application acts (using the compiled specialized program code) to: intercept the received advertisement 116; wrap its code with additional specialized program code; deliver the wrapped advertising code to software application 110 as if the wrapped advertising code has been received directly from server 118, such that the wrapped advertising code is executed in software application 110 in order to scan the advertising code and optionally to allow or prevent the displaying of advertisement 116 based on the scanning. As a result, user 114 of computing device 112 is protected from malicious contents of advertisements, such as links to download unwanted software (which may include, for example, computer viruses), redirects to another HTTP (HyperText Transfer Protocol) resource that displays content in lieu of the advertisement, etc. Another reason to block certain advertisements from displaying is that they are not suitable for the user demographic of the particular software application. For example, if the software application is a game for children, it may be unsuitable to display in its advertisements for gambling. Yet another reason to block certain advertisements is that they cause trademark or brand dilution; brands may not want their advertisements to show in software applications of a character that might degrade the brand. For instance, a large corporation may prefer that its advertisements are not shown inside software applications directed to anti-capitalism activists. In this case, the developer of the software application may not be the one particularly interested in the blocking, but rather the advertiser, or the advertising platform (e.g., Google Ads, Bing Ads, Smaato, etc.), might be the ones promoting the use of specialized program code 108.

Figure 2:
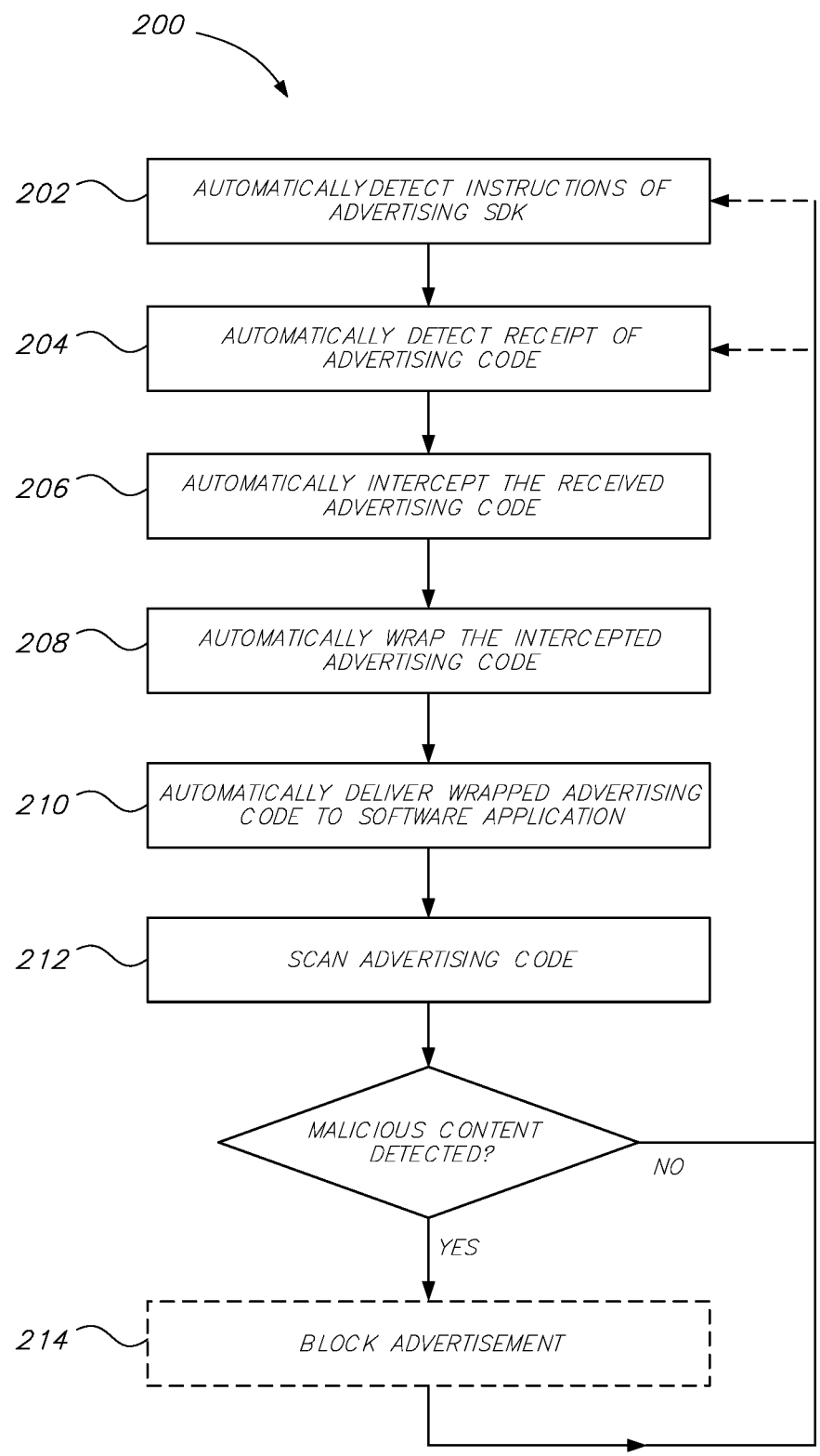
FIG. 2 is a flow chart of a method, according to an embodiment of the present invention.

Reference is now made to FIG. 2, which is a flow chart of a method 200 executed in computing device 112 of FIG. 1, for scanning and optionally blocking advertisements fetched by device 112.

In a step 202, software application 110 (FIG. 1) automatically detects, by executing the specialized program code that was implanted during editing of software project 106 (FIG. 1), that memory being used by the software application on computing device 112 (FIG. 1) includes instructions that are based on an aSDK that was included in the software project. This step may include also detecting the identity of the aSDK, such as whether it is the Microsoft Advertising SDK, the Google Mobile Ads SDK, the Facebook Business SDK, the MoPub SDK, or the AdMob SDK, to name a few examples. The identity of the aSDK may be determined, for example, by looking in the memory for textual and/or numerical strings that are known to be unique to a specific aSDK being executed.

Based on this detection, the following steps of method 200 may be executed in a manner adapted to the specific aSDK that has been identified. Namely, each aSDK may use its own specific programming for fetching advertisements over the network and displaying them, and the next steps of method 200 may interact with that specific programming. Step 202 may be executed only once, when the software application first runs on the computing device. Alternatively, step 202 may be executed once every time the software application is launched. Further alternatively, step 202 may be executed every time the software application attempts to fetch an advertisement.

In a step 204, software application 110 (FIG. 1) may automatically detect, by executing the specialized program code that was implanted during editing of software project 106 (FIG. 1), that the software application has received, over a network (such as the Internet), an advertising code that is configured to display an advertisement within the software application.

For example, if computing device 112 (FIG. 1) runs the Android™ operating system, and software application 110 (FIG. 1) is an Android™ application, then the detection of the receipt of the advertising code may be performed using a Java dynamic proxy, by real-time generation of a class proxy, or through a WebView-type object used by the software application.

The dynamic proxy, optionally written in the Java programming language, may be used if it is determined that the specific aSDK employs a (Java) interface between objects to enable communication between an AdController-type class and an AdView-type class. An instance of the AdController-type class may be responsible for sending and receiving network requests to and from servers that host advertisement, and for and parsing JSON responses from the server into HTML. An instance of the AdView-type class, in turn, may be responsible for rendering for display the HTML received from the instance of the AdController-type class.

The dynamic proxy is a class that implements a list of interfaces specified at runtime, such that a method invocation through one of the interfaces on an instance of the class will be encoded and dispatched to another object through a uniform interface.

Thus, a dynamic proxy class may be used to create a type-safe proxy object for a list of interfaces without requiring pre-generation of the proxy class, such as with a compile-time tool.

In Java, method invocations on an instance of a dynamic proxy class dispatch a single method in the instance's invocation handler, and are encoded with a java.lang.reflect.Method object identifying the method that was invoked and an array of type Object containing the arguments. For example, one of these arguments may be a JSON object containing what the server had sent the computing device, and/or the HTML that was created based on that JSON.

Java dynamic proxies are further discussed in Oracle Corporation, "Dynamic Proxy Classes", available online at https://docs.oracle.com/javase/8/docs/technotes/guides/reflection/proxy.html, last viewed Feb. 20, 2019; and in Baeldung SRL, "Dynamic Proxies in Java", available online at https://www.baeldung.com/java-dynamic-proxies, last viewed Feb. 20, 2019. These documents are incorporated herein by reference in their entirety.

The real-time generation of a class proxy may be used if it is determined that the aSDK employs a (Java) class to enable communication between an AdController-type class and an AdView-type class. This may include generating a Dalvik bytecode class proxy. This class proxy 'mocks' (duplicates) the AdController class, to enable access to any methods it invokes and their arguments. Then, a technique commonly known as 'reflection' may be used to inspect the arguments and specifically locate the HTML included therein.

The real-time generation of a class proxy may be performed, for example, using the 'dexmaker' software package by LinkedIn Corporation, available online at https://github.com/linkedin/dexmaker, last viewed Feb. 20, 2019, the contents of which are incorporated herein by reference in their entirety. 'dexmaker' is a Java-language API (Application Programming Interface) for doing compile time or runtime code generation targeting the Dalvik VM (Virtual Machine).

The utilization of the WebView-type object may be done, for example, if it is determined that the aSDK does not use an interface nor a class to enable communication between an AdController-type class and an AdView-type class. In the Android operating system, a WebView is a type of class that is used to display HTML (HyperText Markup Language) Web pages inside Android software applications. Advertisements are often displayed using WebViews. Thus, we can determine that a WebView-type object has received the advertising code over HTTP.

As another example, if computing device 112 (FIG. 1) runs the iOS® operating system, and software application 110 (FIG. 1) is an iOS® application, then the detection of the receipt of the advertising code may be performed by employing the technique known as 'method swizzling.'

Method swizzling is often defined as the process of changing the implementation of an existing selector in a program written in the Objective-C language. This process is made possible by the fact that method invocations in Objective-C can be changed at runtime, by changing how selectors are mapped to underlying functions in a class's dispatch table. In other programming languages, this technique is sometimes called 'monkey patching'.

Using method swizzling, we gain access to the selector which stores the advertising code received from the server, and to the selector that is used by the software application to handle the receipt and the display of the advertisement. For example, if the AdMob SDK has been used in the creation of the software application, then swizzling the 'adHtml' method used by the AdMob SDK will gain access to the advertising code.

In a step 206, software application 110 (FIG. 1) may automatically intercept the received advertising code, by executing the specialized program code that was implanted during editing of software project 106 (FIG. 1). Interception of the received advertising code may be performed according to the same technique used in step 204 to detect the receipt of the advertising code—in Android: Java dynamic proxy, real-time generation of a class proxy, or WebView-type object; in iOS: Method swizzling. To employ the pertinent technique, we only need to know which aSDK has been used in the creation of the software application, because each such aSDK uses its own unique classes/method that can be then accessed by name.

The advertising code may include HTML and optionally also CSS (Cascading Style Sheets) and/or Javascript. The CSS and/or Javascript may either be embedded in the HTML or be hosted on a remote server and linked to from the HTML.

In a step 208, software application 110 (FIG. 1) may automatically wrap the intercepted advertising code with another, second specialized program code, by executing the specialized program code that was implanted during editing of software project 106 (FIG. 1). The wrapping may be performed according to the same technique used in steps 204-206—in Android: Java dynamic proxy, real-time generation of a class proxy, or WebView-type object; in iOS: Method swizzling. As above, to employ the pertinent technique, we only need to know which aSDK has been used in the creation of the software application, because each such aSDK uses its own unique classes/method that can be then accessed by name.

This second specialized program code may be configured to (namely, include program instructions to): scan the advertising code for malicious content, and optionally also allow or prevent the display of the advertisement within the software application based on the scanning. Namely, if malicious content was found in the scan, the advertisement may be blocked, and vice versa.

The second specialized program code may include Javascript code, and optionally HTML and/or CSS. The act of wrapping may include positioning portions of the second specialized code before and after the advertising code. Alternatively, the second specialized code may be positioned only before or only after the advertising code. Further alternatively, the second specialized code may be interleaved with the advertising code.

This second specialized program code is configured, when executed in the software application (for example, in its WebView), to scan the code which it wraps—the intercepted advertising code. This scanning may include, for example, using one or more regular expressions (RegEx) to search for and find strings of text (including numbers and/or symbols) that are included in a 'blacklist' of strings that are known to be included in malicious advertisements (these string are hereinafter referred to as "malicious contents"). The strings included in the blacklist may comprise, for example, URLs (Uniform Resource Locators) or parts of URLs that were found, in the past, in malicious advertisements. Such URLs may be used by third parties to exert attacks on computerized devices displaying the associated advertisements. The strings may also comprise, for example, snippets of JavaScript and/or HTML code that were found, in the past, in malicious advertisements (but not in legitimate advertisements).

The blacklist may be stored on a remote server (that maintains a suitable database) and be accessed, via a computer network (such as the Internet) by the second specialized program code, either in real time or periodically, to compare its contents with the found strings. If the remote server is to be accessed periodically (e.g., every few hours, days, or weeks), then this may include downloading the blacklist (or just an update to a previously-downloaded blacklist) to computing device 112 (FIG. 1), such that the second specialized program code can quickly compare the found string(s) of text against a locally-stored copy of the blacklist when an advertisement is to be displayed.

The second specialized program code is optionally further configured, when executed in the software application (for example, in its WebView), to transmit a periodic report to the remove server. Such periodic report may include (a) intercepted advertising codes accumulated since the previous report, (b) only those accumulated intercepted advertising codes that were found to include string(s) from the blacklist, or (c) out of the latter, only the string(s) themselves.

In addition to a blacklist or instead one, a whitelist may be used. The whitelist may include strings of text whose existence in the intercepted advertising code means the advertisement is legitimate and should be allowed to be displayed. For example, the whitelist may certain URLs that are known to be legitimate.

The second specialized program code is optionally further configured, when executed in the software application (for example, in its WebView), to block the display of the advertisement, if its scanning resulted in the detection of malicious contents. The blocking may include, for example, the execution of Javascript code that prevents the WebView from rendering the advertising code in a designated advertising space inside the software application. Thus, blank space may be shown in the designated advertising space, in lieu of the advertisement.

In some scenarios, the malicious content in the advertising code contains one or more client-side scripts, written for example in Javascript, that employ software methods configured to attempt to invoke a user event without an action by a user of the computing device. This may be referred to as a "redirection attack".

For example, such invoked used events may include the opening of an HTTP link using a web browser of the computing device, which naturally occurs beyond the bounds of the dedicated advertising space. That HTTP link may be to an HTML document, hosted on some remote Web server, that includes further advertisements or even links to download additional software applications onto the computing device. Such additional software applications may infect the computing device with a computer virus, a trojan, etc. The HTTP link may be to a URL of a software application hosted inside an "app store", such as the App Store of Apple, Inc., the Google Play App Store of Google, Inc., or the Microsoft Store of Microsoft Corp; as the HTTP link is opened, the computing device may automatically launch a software application that implements the pertinent app store, such as the "App Store" software application on iOS devices, etc. Therefore, the user of the computing device will suddenly be presented with an offer to download an additional software application onto her computing device—all as the result of the malicious content that managed to break out of the designated advertising space.

The following code, which combines HTML and Javascript, is an example of a redirection attack which may accompany seemingly-innocent advertising code. Annotations are shown with a preceding double slash:

combined HTML/Javascript code: (a) listens to software methods that attempt to invoke a user event without an action by a user of the computing device, and (b) analyze the user event to determine if the user event is configured to cause the computing device to perform an action outside a dedicated advertising space of the software application. If so—then the contents of the advertising code are indeed malicious, and adapted for a redirection attack.

The listening is to synthetic events, masqueraded as events performed by the real user of the computing device ("user events"), because this type of events is capable of instructing the WebView of the dedicated advertising space to perform actions beyond the limited environment of that space.

The listening may be performed by way of hooking to software methods (i.e. Document Object Model "DOM" methods) that have the aforementioned capability to synthesize user events. The hooking essentially intercepts events that are triggered by these software method, such that we are able to inspect them before they reach execution.

The hooking may be, for example, to one or more of the following DOM methods: "HTMLElement.prototype.click", "EventTarget.prototype.dispatchEvent", "HTMLFormElement.prototype.submit", "Event( )" constructor, "fireEvent( )", "document.createEvent", "Event.initEvent( )", "MouseEvent", and "UIEvent".

Once one of these hooks intercepts and detects an event, the following analysis takes place: Is the intercepted event is

```
<html>
<body>
<script>
var target = 'https://www.ynet.co.il'; // This variable contains the URL to which
the redirection will be made.
function redirect(e) {
    if (e == 'link') {//A first scenario, attempting to redirect by a simulated click
on a link.
        var f = document.createElement('a'); // Creates a link that will later
be subjected to a simulated user click.
        f.target = '_top'; //Instructs the browser that the link will be opened
in the '_top' document.
        f.href= target;
        document.body.appendChild(f); // Adds object "f", which includes
the link and its target, to the present document (displayed in an iframe).
        var g = document.createEvent('MouseEvent');
        g.initMouseEvent('click', !![ ], !![ ], window, 0x0, 0x0, 0x0, 0x0, 0x0,
![ ], ![ ], ![ ], ![ ], 0x0, null); // Prepare a simulated click event.
        f.dispatchEvent(g); // Will trigger the simulated click event.
    } else if (e == 'form') { // A second scenario, to be activated in the first
scenario fails. In this scenario, a form submission is simulated.
        var h = document.createElement('form'); // Creates a form that will
later be subjected to a simulated from submission.
        h.target = "_top"; // Instructs the browser that the form will submit
to the '_top' document.
        h.action = target;
        h.method = 'GET';
        document.body.appendChild(h); // Adds object "h", which includes
the form and its target, to the present document (displayed in the iframe).
        h.submit( ); // Will trigger the simulated form submission.
    }
};
setTimeout(function ( ) {
    redirect('link'); // Run the redirect function using the link method.
},1);
setTimeout(function ( ) {
    redirect('form'); // Run the redirect function using the form method.
},2000); // The function will be run after a 2-second delay.
</script>
</body>
</html>
```

To prevent such redirection attempts, the second specialized program code, which is optionally Javascript code or a user event configured to cause the WebView to navigate away from it? User events suspicious of that may be events such as "document.createEvent", "Event.initEvent", use of an "Event( )" constructor to create a new event, and/or a registration of a new event listener (such as "EventTarget.addEventListener", "attachEvent( )", or "captureEvents( )").

The exact technique to analyze the intercepted user event and determine if it is configured to navigate away from the WebView may differ, based on the nature of the DOM method. The following exemplary Javascript codes show both the hooks and the analyses done to determine if the intercepted user events can navigate away from the WebView:

In the case of the DOM method being "HTMLElement.prototype.click" the following exemplary Javascript code may be used:

```
1:     _click = HTMLAElement.protoype.click;
2:     HTMLElement.protoype.click = function ( ) {
3:         if (this.target === '_top') {
4:             reportRedirect({
5:                 target: this.href;
6:             });
7:         } else {
8:             return _click.call(this);
9:         }
10:    }
```

In line 1 of the code, the original HTMLAElement.protoype.click function that was called by the potentially malicious code (namely, the advertising code) is saved to a variable called "_click", for later use.

In line 2, the HTMLAElement.protoype.click is hooked to. When the potentially malicious code attempts to invoke that DOM event, the function in lines 3-10 will first execute, while the original invocation is placed on hold.

In line 3, the code checks if the target the HTMLAElement.prototype.click is the '_top' document. If it is, then line 4 may report that redirection attempt to a remote server. The report may include, for example, the URL which the potentially malicious code attempted to navigate to, as line 5 shows. The server may then determine whether the navigation should be prevented or allowed to proceed. For example, the server may compare the target URL of the redirection attempt against a blacklist and/or a whitelist of URLs. As another example, the server may instruct to block any and all redirection attempts, regardless of the target URL. If the server decides not to prevent the redirection, then line 8 may execute, fetching the contents of the original HTMLAElement.protoype.click from the saved "_click" variable, and allowing it to execute. Then, we return to the listening stage and continue monitoring future events. If the server decides to prevent the redirection, then line 8 may be skipped, which will not release the previous-set hook and effectively prevent the navigation (note that the above exemplary code does not show, for reasons of brevity, the exact mechanism of communicating with the remote server, receiving its instructions and executing them).

In the case of the DOM method being "EventTarget.prototype.dispatchEvent" the following exemplary Javascript code may be used:

```
1:     _dispatchEvent = EventTarget.prototype.dispatchEvent;
2:     EventTargetprototype.dispatchEvent = function (event) {
3:         var isClick = event.type === 'click';
4:         var isTopNav = event.target.target === '_top';
5:         var url = event.target.href \\ event.target.action;
6:         if (isClick && isTopNav) {
7:             reportRedirect({
8:                 target: url
9:             });
10:        } else {
11:            _dispatchEvent.apply(this, arguments);
12:        }
13:    };
```

In line 1 of the code, the original EventTargetprototype.dispatchEvent function that was called by the potentially malicious code is saved to a variable called "dispatchEvent", for later use.

In line 2, the EventTargetprototype.dispatchEvent is hooked and listened to. When the potentially malicious code attempts to invoke that DOM event, the function in lines 3-13 will first execute, while the original invocation is placed on hold.

The analysis is performed in lines 3-6:

In line 3, the code checks if the event type of EventTarget.prototype.dispatchEvent is a click event, and stores "true" or "false" in a "isClick" variable.

In line 4, the code stores the redirection URL to a "url" variable, whether it originates in an "a" HTML tag or a "form" HTML tag.

In line 5, the code checks if the event is both a click and targets the '_top' document.

In lines 7 and 8, like in the previous code sample, the redirect attempt may be reported to a remote server. Line 11 allows the original EventTargetprototype.dispatchEvent to execute, if a decision to allow this to happen has been reached.

In the case of the DOM method being "HTMLFormElement.prototype.submit" the following exemplary Javascript code may be used:

```
1:     submit = HTMLFormElement.prototype.submit;
2:     HTMLFormElement.prototype.submit = function ( ) {
3:         if (this.target === '_top') {
4:             reportRedirect({
5:                 target: this.action;
6:             });
7:         } else {
8:             return_submit.call(this);
9:         }
10:    }
```

In line 1, reference to the original submit function is saved.

The function of line 2 will be called when a potentially-malicious script calls "a.click( )".

Line 3 checks whether the target of the form submission is the "_top" document.

Line 4 reports the redirection attempt to a remote server, if the check of line 3 was positive.

Line 5 includes, in the report, the target URL of the redirection attack.

Line 8, executed if the target was not the '_top' document, allows the form to submit normally and without any intervention.

Note that the preventing of the navigation need not necessarily be decided by the server. It is optional to simply allow the Javascript code to prevent navigation immediately upon detecting that the event can navigate the main document. The report to the server may be carried out, for example, if it is desired to let the server run a more thorough check first, or to simply log the occurrence.

In the above examples, the URL to which the malicious code attempts to redirect may sometimes be obfuscated to avoid detection. For example, the author of the malicious code may encode the target URL in such a way to fail any attempt to match it against a blacklist of URLs. For instance, the URL google.com may be encoded as "//%77%77%77%2E %67%6F %6F %67%6C %65%2E %63%6F %6D". While this means nothing to an unsuspecting observer, the WebView, when decoding the string, will navigate to google.com. Accordingly, we can optionally use the WebView's own parser to first decode the target for the redirection, before transmitting it to the remote server and/or comparing it against a black list or a white list.

In a step 210, the wrapped advertising code may be automatically delivered to software application 110 (FIG. 1), by executing the specialized program code that was implanted during editing of software project 106 (FIG. 1). This delivery may be performed as if the wrapped advertising code was received directly from the server with which the software application has communicated to receive the advertising code. Namely, the software application may not even be aware that it is being delivered with advertising code that was intercepted and wrapped. Because the techniques described above (Java dynamic proxy, real-time generation of a class proxy, method swizzling) are able to access the communications between the AdController and the WebView, the delivery of the wrapped advertising code may be performed by feeding the wrapped advertising code to the WebView; the WebView receives this without knowing it was not really transmitted by the original AdController.

The delivery may be performed according to the same technique used in steps 204-208—in Android: Java dynamic proxy, real-time generation of a class proxy, or WebView-type object; in iOS: Method swizzling. As above, to employ the pertinent technique, we only need to know which aSDK has been used in the creation of the software application, because each such aSDK uses its own unique classes/method that can be then accessed by name.

Upon delivery of the wrapped advertising code, the above-discussed scanning 212 and optional blocking 214 are executed.

Steps 204-212, and optionally also 202 and/or 214, may be executed in real-time, optionally every time the software application attempts to fetch an advertisement. These steps may execute rapidly, such that the end user of the computing device does not feel a delay in the display of the advertisement in the allocated space. Optionally, all the steps of method 200 may execute within less than 1000 milliseconds (ms), less than 500 ms, less than 200 ms, or less than 100 ms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Steps described as being "automatic" are performed without human intervention, namely, by a computer that is pre-programmed to perform the pertinent step without a human user having to manually instruct the computer to perform the step.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The description of program code, program instructions, computer instructions, software methods, or the like, which are said to be 'configured' to execute certain actions, may refer to these elements being programmed to execute those actions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, in a software application:
   (a) automatically intercepting an advertising code received by the software application from a server, wherein the advertising code is configured to display an advertisement within the software application;
   (b) automatically adding, to the intercepted advertising code, program code that is configured to:
   scan the advertising code for malicious content, and perform at least one of the following actions:
   (i) allow or prevent the display of the advertisement within the software application based on the scanning, and
   (ii) report the malicious content, over a computer network, to a remote database which stores a blacklist of malicious content; and
   (c) automatically delivering the intercepted advertising code, jointly with the added program code, to the software application, such that, when the joint codes are executed in the software application, the following actions are automatically performed:
   the scanning of the advertising code for malicious content, and at least one of actions (i) and (ii),
   wherein the software application is an iOS application or an Android application and wherein actions (a) through (c) are performed by method swizzling.

2. The method according to claim 1, wherein said delivering is performed as if the joint codes were received directly from the server.

3. The method according to claim 2, wherein:
   said intercepting is performed prior to the software application being able to communicate the advertising code to an HTML rendering object of the software application, and said delivering comprises feeding the joint codes to the HTML rendering object, such that:
   the advertising code is not singularly communicated to the HTML rendering object, and
   the HTML rendering object receives only the joint codes.

4. The method according to claim 3, wherein the HTML rendering object is an AdView-type object.

5. The method according to claim 1, further comprising, prior to execution of step (a):
   automatically detecting that computing device memory being used by the software application includes instructions that are based on a certain advertising Software Development Kit (SDK),
   wherein actions (a)-(c) interoperate with the instructions that are based on the certain advertising SDK.

6. The method according to claim 1, wherein when the software application is an Android application, the method further comprises:
   determining whether the software application:
   (i) uses an interface between objects to enable communication between an AdController-type class and an AdView-type class, or (ii) uses a class to enable communication between an AdController-type class and an AdView-type class.

7. The method according to claim 6, wherein:
when condition (i) holds true, steps (a) through (c) are performed using a dynamic proxy;
when condition (ii) holds true, steps (a) through (c) are performed using real-time generation of a class proxy; and
when neither one of conditions (i) and (ii) hold true, steps (a) through (c) are performed through a WebView-type object used by the software application.

8. The method according to claim 1, wherein the method swizzling comprises overriding an implementation of an existing selector of the software the receipt of the advertising code and the display of the advertisement.

9. The method according to claim 1, wherein the scanning of the advertising code comprises:
listening to software methods that attempt to invoke a user event without an action by a user of the computing device on which the software application is executed; and
analyzing the user event to determine if the user event is configured to cause the computing device to perform an action outside a dedicated advertising space of the software application.

10. The method according to claim 9, wherein the user event is determined to be configured to cause the computing device to perform the action outside the dedicated advertising space of the software application, if the user event is of the group consisting of:
"document.createEvent";
"Event.initEvent";
a use of an "Event( )" constructor to create a new event; and
a registration of a new event listener.

11. The method according to claim 10, wherein said new event listener is selected from the group consisting of:
"EventTarget.addEventListener";
"attachEvent( )"; and
"captureEvents( )".

12. The method according to claim 11, wherein the preventing of the advertisement from being displayed comprises:
preventing the user event from causing the computing device to perform the action outside the dedicated advertising space of the software application.

13. The method according to claim 1, wherein the scanning of the advertising code for malicious content comprises:
searching the advertising code for one or more strings of text that are included in a blacklist of strings which are known to be included in malicious advertisements.

14. The method according to claim 13, wherein:
the blacklist is stored on a remote server;
the method further comprises accessing the remote server periodically, to download the blacklist or an update to the blacklist; and
wherein the searching comprises comparing the one or more strings of text against the downloaded blacklist.

15. A software application embodied as program code on a non-transitory computer-readable storage medium, the program code executable by at least one hardware processor to:
(a) automatically Intercept an advertising code received by the software application from a server, wherein the advertising code is configured to display an advertisement within the software application;
(b) automatically add, to the intercepted advertising code, program code that is configured to:
scan the advertising code for malicious content, and perform at least one of the following actions:
(i) allow or prevent the display of the advertisement within the software application based on the scanning, and
(ii) report the malicious content, over a computer network, to a remote database which stores a blacklist of malicious content; and
(c) automatically deliver the intercepted advertising code, jointly with the added program code, to the software application, such that, when the joint codes are executed in the software application, the following actions are automatically performed:
the scanning of the advertising code for malicious content, and at least one of actions (i) and (ii),
wherein the software application is an KOS application or an Android application, and wherein actions (a) through (c) are performed by method swizzling.

16. The software application according to claim 15, wherein said delivering is performed as if the joint codes were received directly from the server.

17. The software application according to claim 16, wherein:
said intercepting is performed prior to the software application being able to communicate the advertising code to an HTML rendering object of the software application, and said delivering comprises feeding the joint codes to the HTML rendering object, such that:
the advertising code is not singularly communicated to the HTML rendering object, and
the HTML rendering object receives only the joint codes.

18. The software application according to claim 17, wherein the HTML rendering object is an AdView-type object.

19. The software application according to claim 15, wherein the program code is further executable, prior to step (a), to:
automatically detect that computing device memory being used by the software application includes instructions that are based on a certain advertising Software Development Kit (SDK),
wherein actions (a)-(c) interoperate with the instructions that are based on the certain advertising SDK.

20. The software application according to claim 15, wherein when the software application is an Android application, and wherein the program code is further executable to: determine whether the software application:
(i) uses an interface between objects to enable communication between an AdController-type class and an AdView-type class, or
(ii) uses a class to enable communication between an AdController-type class and an AdView-type class.

21. The software application according to claim 20, wherein:
when condition (i) holds true, steps (a) through (c) are performed using a dynamic proxy;
when condition (ii) holds true, steps (a) through (c) are performed using real-time generation of a class proxy; and
when neither one of conditions (i) and (ii) hold true, steps (a) through (c) are performed through a WebView-type object used by the software application.

22. The software application according to claim 15, wherein the method swizzling comprises overriding an implementation of an existing selector of the software application, wherein the existing selector is used by the software application to handle the receipt of the advertising code and the display of the advertisement.

23. The software application according to claim 15, wherein the scanning of the advertising code comprises:
   listening to software methods that attempt to invoke a user event without an action by a user of the computing device on which the software application is executed; and
   analyzing the user event to determine if the user event is configured to cause the computing device to perform an action outside a dedicated advertising space of the software application.

24. The software application according to claim 15, wherein the scanning of the advertising code for malicious content comprises:
   searching the advertising code for one or more strings of text that are included in a blacklist of strings which are known to be included in malicious advertisements.

25. The software application according to claim 23, wherein the user event is determined to be configured to cause the computing device to perform the action outside the dedicated advertising space of the software application, if the user event is of the group consisting of:
   "document.createEvent";
   "Event.initEvent";
   a use of an "Event( )" constructor to create a new event; and
   a registration of a new event listener.

26. The software application according to claim 25, wherein said new event listener is selected from the group consisting of:
   "EventTarget.addEventListener";
   "attachEvent( )"; and
   "captureEvents( )".

27. The software application according to claim 26, wherein the preventing of the advertisement from being displayed comprises:
   preventing the user event from causing the computing device to perform the action outside the dedicated advertising space of the software application.

28. The software application according to claim 24, wherein:
   the blacklist is stored on a remote server;
   the program code is further executable to access the remote server periodically, to download the blacklist or an update to the blacklist; and
   wherein the searching comprises comparing the one or more strings of text against the downloaded blacklist.

29. A system comprising: at least one hardware processor; and
   a non-transitory computer-readable storage medium having program code embodied therewith, the program code executable by said at least one hardware processor to:
   (a) automatically Intercept an advertising code received by the software application from a server, wherein the advertising code is configured to display an advertisement within the software application;
   (b) automatically add, to the intercepted advertising code, program code that is configured to:
   scan the advertising code for malicious content, and perform at least one of the following actions:
   (i) allow or prevent the display of the advertisement within the software application based on the scanning, and
   (ii) report the malicious content, over a computer network, to a remote database which stores a blacklist of malicious content; and
   (c) automatically deliver the Intercepted advertising code, jointly with the added program code, to the software application, such that, when the joint codes are executed in the software application, the following actions are automatically performed:
   the scanning of the advertising code for malicious content, and at least one of actions (i) and (ii),
   wherein the software application is an iOS application or an Android application, and wherein actions (a) through (c) are performed by method swizzling.

* * * * *